United States Patent
Mitani et al.

(10) Patent No.: US 9,950,588 B2
(45) Date of Patent: Apr. 24, 2018

(54) VEHICLE

(71) Applicant: HONDA MOTOR CO., LTD., Tokyo (JP)

(72) Inventors: Manabu Mitani, Wako (JP); Koichi Takahashi, Wako (JP); Kazuya Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/296,037

(22) Filed: Oct. 18, 2016

(65) Prior Publication Data

US 2017/0106717 A1   Apr. 20, 2017

(30) Foreign Application Priority Data

Oct. 20, 2015   (JP) .................................. 2015-206586

(51) Int. Cl.
*B60K 1/04*   (2006.01)
*B60H 1/00*   (2006.01)
(Continued)

(52) U.S. Cl.
CPC ......... *B60H 1/00278* (2013.01); *B60H 1/004* (2013.01); *B60H 1/00457* (2013.01); *B60H 1/00564* (2013.01); *B60H 1/143* (2013.01); *B60K 1/04* (2013.01); *B60L 11/1874* (2013.01); *B60L 11/1877* (2013.01); *B60L 15/007* (2013.01); *B60K 2001/005* (2013.01); (Continued)

(58) Field of Classification Search
CPC ............ B60H 1/00278; B60H 1/00457; B60H 1/00564; B60H 1/004; B60L 11/1874; B60L 11/1877; B60L 15/007; B60L 2210/10; B60K 1/04; B60K 2001/0416; B60K 2001/005; B60Y 2200/92; B60Y 2306/05; Y10S 903/907

See application file for complete search history.

(56) References Cited

U.S. PATENT DOCUMENTS

| 5,937,664 A * | 8/1999 | Matsuno | B60H 1/00278 62/186 |
|---|---|---|---|
| 7,642,002 B2 * | 1/2010 | Hamery | B60L 11/1874 180/68.1 |

(Continued)

FOREIGN PATENT DOCUMENTS

JP   2010-089531   4/2010

*Primary Examiner* — Jacob B Meyer
(74) *Attorney, Agent, or Firm* — Mori & Ward, LLP (57) ABSTRACT

A vehicle includes a high voltage equipment-accommodation portion, a cooling mechanism, and a discharge passage. The high voltage equipment-accommodation portion is provided behind a seat and includes a high voltage equipment. The cooling mechanism cools the high voltage equipment with cooling air introduced from an outside of the high voltage equipment-accommodation portion and diffuses in the high voltage equipment-accommodation portion the cooling air which has cooled the high voltage equipment. The discharge passage connects a lower end part of the high voltage equipment-accommodation portion and a vicinity of a floor surface in the vehicle interior. The cooling mechanism is configured to discharge the cooling air in the high voltage equipment-accommodation portion downwardly to the vehicle interior via the discharge passage.

15 Claims, 8 Drawing Sheets

(51) Int. Cl.
  *B60L 11/18* (2006.01)
  *B60L 15/00* (2006.01)
  *B60H 1/14* (2006.01)
  *B60K 1/00* (2006.01)

(52) U.S. Cl.
  CPC ... *B60K 2001/0416* (2013.01); *B60L 2210/10* (2013.01); *B60Y 2200/92* (2013.01); *B60Y 2306/05* (2013.01); *Y10S 903/907* (2013.01)

(56) References Cited

U.S. PATENT DOCUMENTS

| | | | | |
|---|---|---|---|---|
| 7,810,596 B2* | 10/2010 | Tsuchiya | ............... | B60K 1/04 180/68.1 |
| 7,900,727 B2* | 3/2011 | Shinmura | ............... | B60K 1/04 180/68.1 |
| 7,988,543 B2* | 8/2011 | Major | ............... | B60H 1/00278 454/107 |
| 8,118,354 B2* | 2/2012 | Lucas | ............... | B60H 1/00278 296/208 |
| 8,556,017 B2* | 10/2013 | Kubota | ............... | B60K 1/04 180/68.1 |
| 8,684,118 B2* | 4/2014 | Kosaka | ............... | B60H 1/00278 180/68.2 |
| 9,000,724 B2* | 4/2015 | Minami | ............... | B60H 1/00278 320/109 |
| 9,054,399 B2* | 6/2015 | Mishima | ............... | B60K 1/04 |
| 9,067,486 B2* | 6/2015 | Janarthanam | ....... | H01M 10/625 |
| 9,166,258 B2* | 10/2015 | Takizawa | ............ | B60L 11/1874 |
| 2003/0226653 A1* | 12/2003 | Takedomi | .......... | B60H 1/00278 165/43 |
| 2009/0071178 A1* | 3/2009 | Major | ................ | B60H 1/00278 62/239 |
| 2009/0152031 A1* | 6/2009 | Lim | ........................ | B60K 1/04 180/68.1 |
| 2012/0073797 A1* | 3/2012 | Park | ................... | B60H 1/00278 165/201 |
| 2013/0330587 A1* | 12/2013 | Takahashi | .......... | H01M 2/1077 429/99 |
| 2015/0060169 A1* | 3/2015 | Janarthanam | ....... | H01M 10/625 180/68.2 |
| 2017/0106717 A1* | 4/2017 | Mitani | ............... | B60H 1/00278 |
| 2017/0106718 A1* | 4/2017 | Nakano | ............. | B60H 1/00028 |
| 2017/0106734 A1* | 4/2017 | Mitani | .................... | B60K 1/04 |
| 2017/0106735 A1* | 4/2017 | Mitani | .................... | B60K 1/04 |
| 2017/0106910 A1* | 4/2017 | Mitani | ............ | B62D 21/152 |
| 2017/0110774 A1* | 4/2017 | Nakano | ............. | H01M 10/6566 |

* cited by examiner

VEHICLE

CROSS-REFERENCE TO RELATED APPLICATIONS

The present application claims priority under 35 U.S.C. § 119 to Japanese Patent Application No. 2015-206586, filed Oct. 20, 2015. The contents of this application are incorporated herein by reference in their entirety.

BACKGROUND OF THE INVENTION

Field of the Invention

The present invention relates to a vehicle.

Discussion of the Background

High voltage equipment including a battery (high voltage battery), a DC-DC converter, and an inverter is installed in vehicles such as an electric vehicle and a hybrid vehicle. This type of vehicle includes a cooling mechanism for maintaining the temperature of high voltage equipment within an appropriate range, to prevent degradation in performance of the high voltage equipment due to an abnormal temperature rise. For example, Japanese Patent Application Publication No. 2010-89531 discloses a vehicle that cools high voltage equipment arranged behind a seat with cooling air introduced from the vehicle inside, and discharges the cooling air used for cooling, into the vehicle inside and to the outside of the vehicle.

SUMMARY OF THE INVENTION

According to one aspect of the present invention, a vehicle includes high voltage equipment and a cooling mechanism. The high voltage equipment is accommodated in a high voltage equipment-accommodation portion provided behind a seat. The cooling mechanism cools the high voltage equipment with cooling air introduced from outside the high voltage equipment-accommodation portion. The cooling mechanism diffuses cooling air used for cooling the high voltage equipment into the high voltage equipment-accommodation portion, and then discharges the air from inside the high voltage equipment-accommodation portion into a vehicle inside, through a discharge passage. The discharge passage guides air inside the high voltage equipment-accommodation portion downward from a lower end part of the high voltage equipment-accommodation portion, and discharges the air into the vehicle inside from the vicinity of a floor surface of the vehicle inside.

According to another aspect of the present invention, a vehicle includes a high voltage equipment-accommodation portion, a cooling mechanism, and a discharge passage. The high voltage equipment-accommodation portion is provided behind a seat and includes a high voltage equipment. The cooling mechanism cools the high voltage equipment with cooling air introduced from an outside of the high voltage equipment-accommodation portion and diffuses in the high voltage equipment-accommodation portion the cooling air which has cooled the high voltage equipment. The discharge passage connects a lower end part of the high voltage equipment-accommodation portion and a vicinity of a floor surface in the vehicle interior. The cooling mechanism is configured to discharge the cooling air in the high voltage equipment-accommodation portion downwardly to the vehicle interior via the discharge passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, an embodiment of a vehicle of the present invention will be described with reference to the accompanying drawings. Note that the drawings are to be viewed in the direction of the reference numerals. In the following description, front and rear, right and left, and upper and lower directions are based on directions as viewed from the driver, and in the drawings, Fr indicates the front, Rr indicates the rear, L indicates the left, R indicates the right, U indicates the upper direction, and D indicates the lower direction of the vehicle.

[Vehicle]

Figure 1:
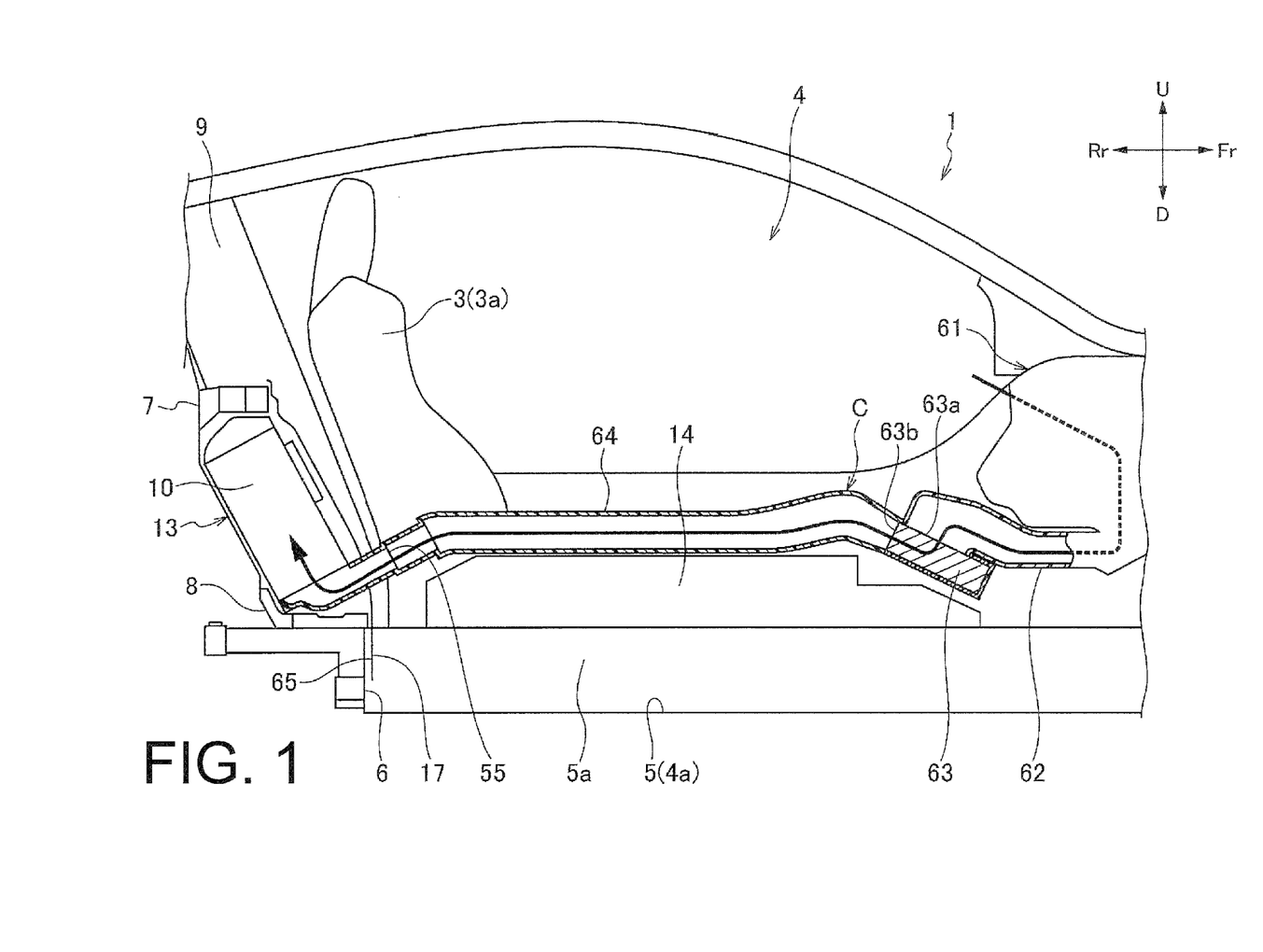
FIG. 1 is a schematic right side view of the interior of a vehicle according to an embodiment of the present invention.
Figure 2:
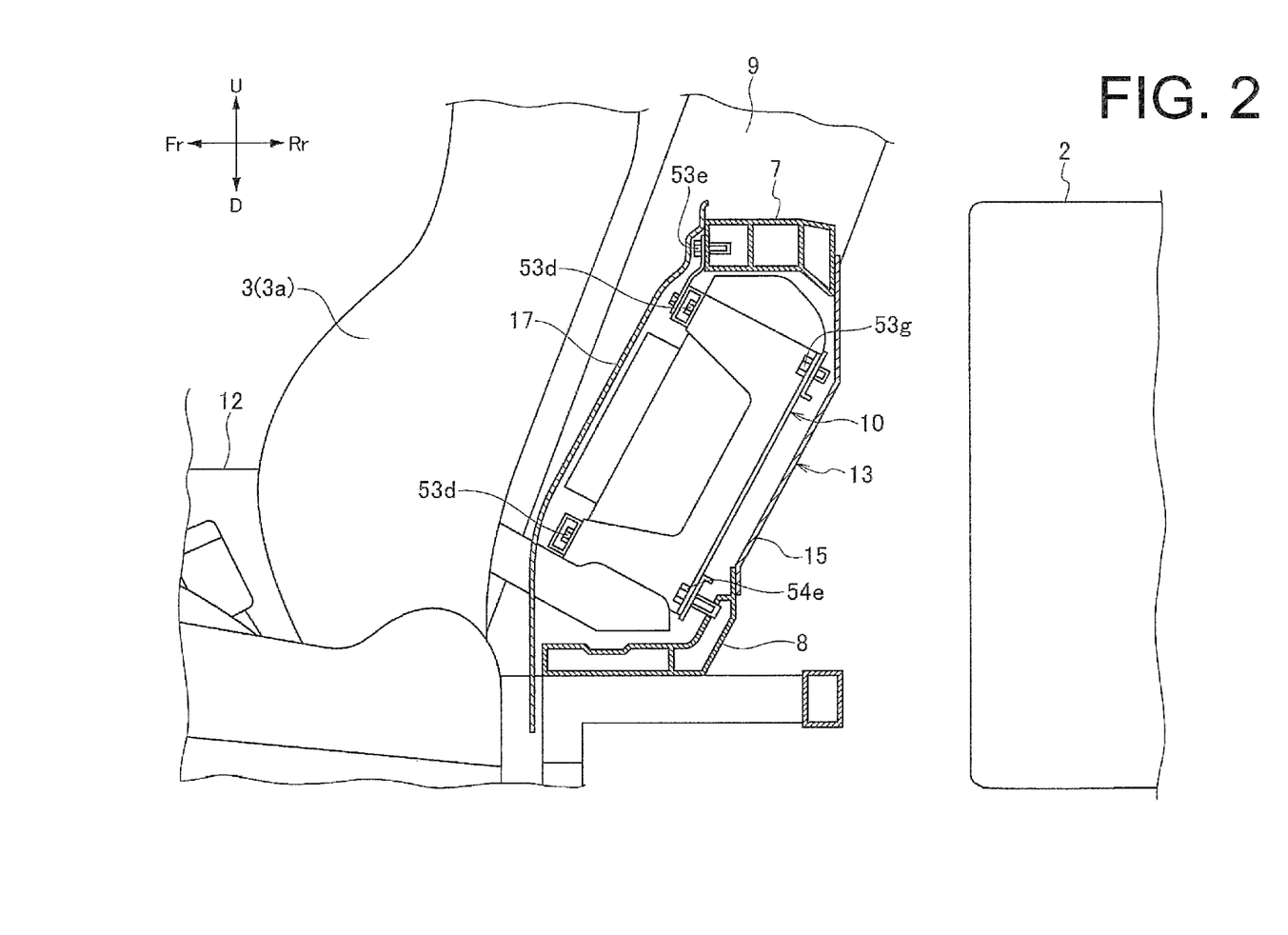
FIG. 2 is a left side view in which the rear of a seat is enlarged.

FIG. 1 is a schematic right side view of the interior of the vehicle according to an embodiment of the present invention, and FIG. 2 is a left side view in which the rear of a seat is enlarged.

As shown in FIGS. 1 and 2, a vehicle 1 of the embodiment is a hybrid sports vehicle in which an engine 2 is installed in a rear part of the vehicle body, and right and left seats 3 are arranged in front of the engine. In the vehicle, engine power drives right and left rear wheels (not shown), and two motors (not shown) drive right and left front wheels (not shown).

A floor panel 5 constituting a floor surface of a vehicle inside 4 includes a center tunnel 5a, which extends along the longitudinal direction at the center in the vehicle width direction. An upward rising kick-up portion 6 is formed in a rear end part of the floor panel 5. An inverter case 14 accommodating an inverter (not shown), which converts a DC voltage of a high voltage battery into a three-phase AC voltage and drives the motors, is provided above the center tunnel 5a. The seats 3 are arranged in front of the kick-up portion 6, on the right and left with the center tunnel 5a interposed therebetween, and a center console 12 covering an upper part of the center tunnel 5a is provided between the right and left seats 3.

An upper member 7 extending in the vehicle width direction is arranged in an upper part behind the seats 3, and a lower member 8 extending in the vehicle width direction on an upper part of the kick-up portion 6 is arranged in a lower part behind the seats 3. Also, a right and left pair of pillars 9 stand on both end parts in the vehicle width direction of the vehicle 1, behind the seats 3 in side view. A high voltage equipment-accommodation portion 13 is provided between the right and left pair of pillars 9.

[High Voltage Equipment-Accommodation Portion]

Figure 3:
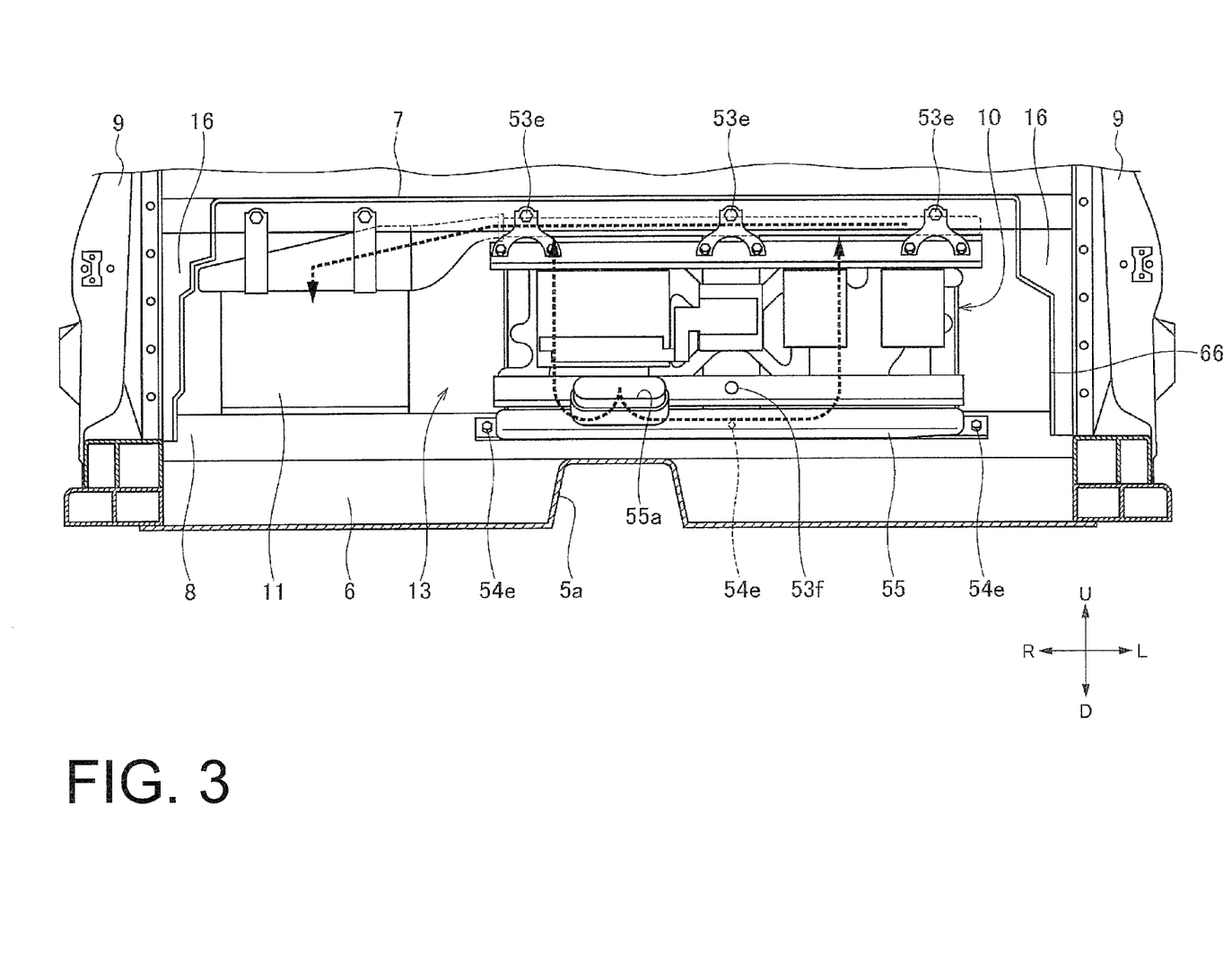
FIG. 3 is a front view of a high voltage equipment-accommodation portion in which a battery unit is arranged.
Figure 7:
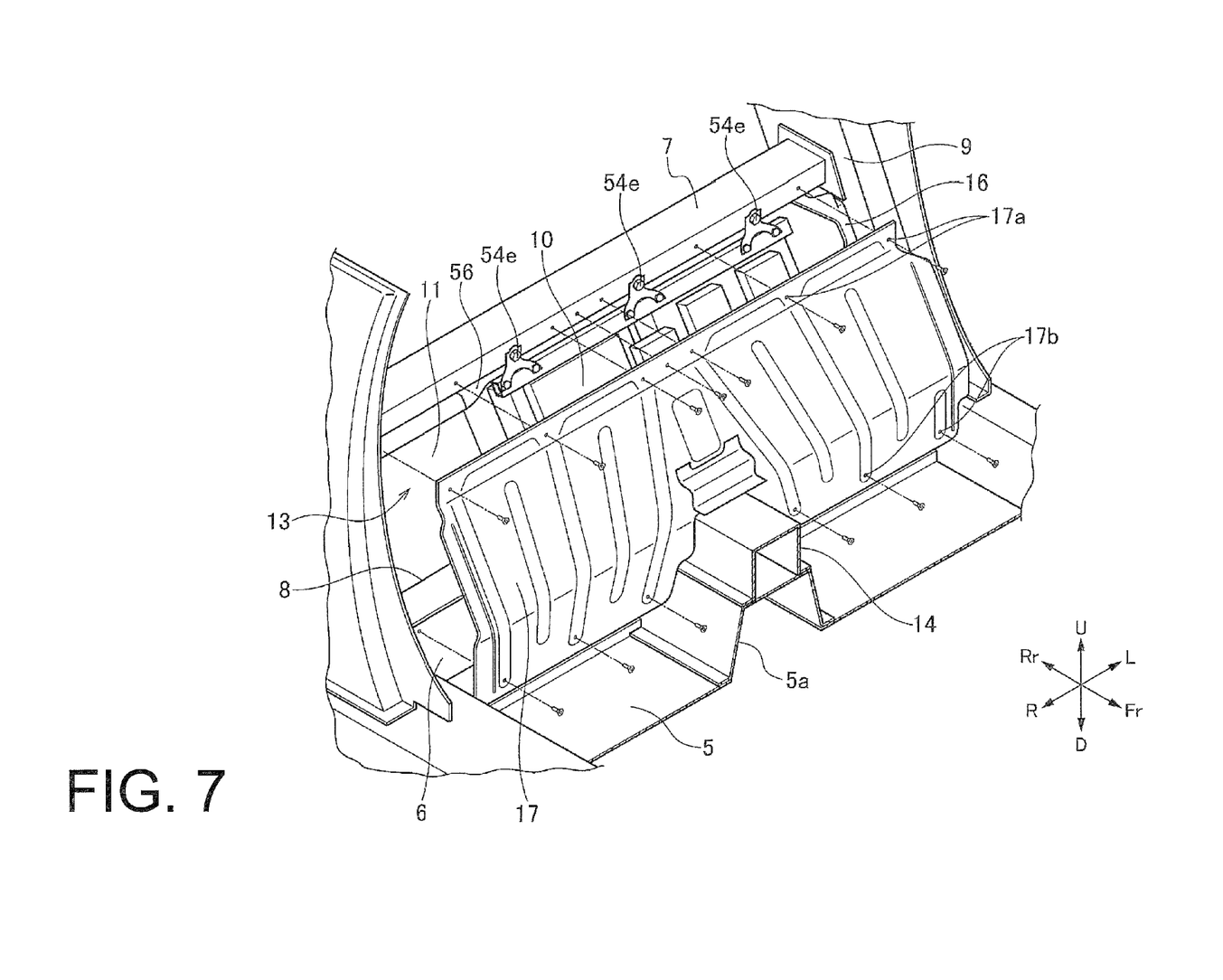
FIG. 7 is an exploded perspective view of a high voltage equipment-protection cover covering the front of the high voltage equipment-accommodation portion.

FIG. 3 is a front view of the high voltage equipment-accommodation portion 13, and FIG. 7 is an exploded perspective view of a high voltage equipment-protection cover 17 covering the front of the high voltage equipment-accommodation portion 13.

As shown in FIGS. 2 and 3, in the high voltage equipment-accommodation portion 13, the upper member 7 partitions an upper part, the lower member 8 partitions a lower part, the right and left pillars 9 partition right and left sides, and a rear cover 15, which is fastened to the upper member 7, lower member 8, and right and left pillars 9, partitions a rear part. The high voltage equipment-accommodation portion 13 accommodates a battery unit 10 and a DC-DC converter 11, which steps the high voltage battery down and supplies the voltage to low voltage equipment.

As shown in FIG. 7, the high voltage equipment-protection cover 17 covers the front of the high voltage equipment-accommodation portion 13, which accommodates the battery unit 10 and the DC-DC converter 11. The high voltage equipment-protection cover 17 includes multiple fastening points 17a, 17b in upper and lower end parts thereof. The high voltage equipment-protection cover 17 partitions the front part of the high voltage equipment-accommodation portion 13, when the fastening points 17a, 17b are fastened to the upper member 7 and the lower member 8.

[High Voltage Equipment]

The vehicle 1 is provided with the battery unit 10 consisting of a high voltage battery, as high voltage equipment. As mentioned above, the battery unit 10, together with the DC-DC converter 11 which is also high voltage equipment, is accommodated in the high voltage equipment-accommodation portion 13 provided behind the seat 3.

Figure 4:
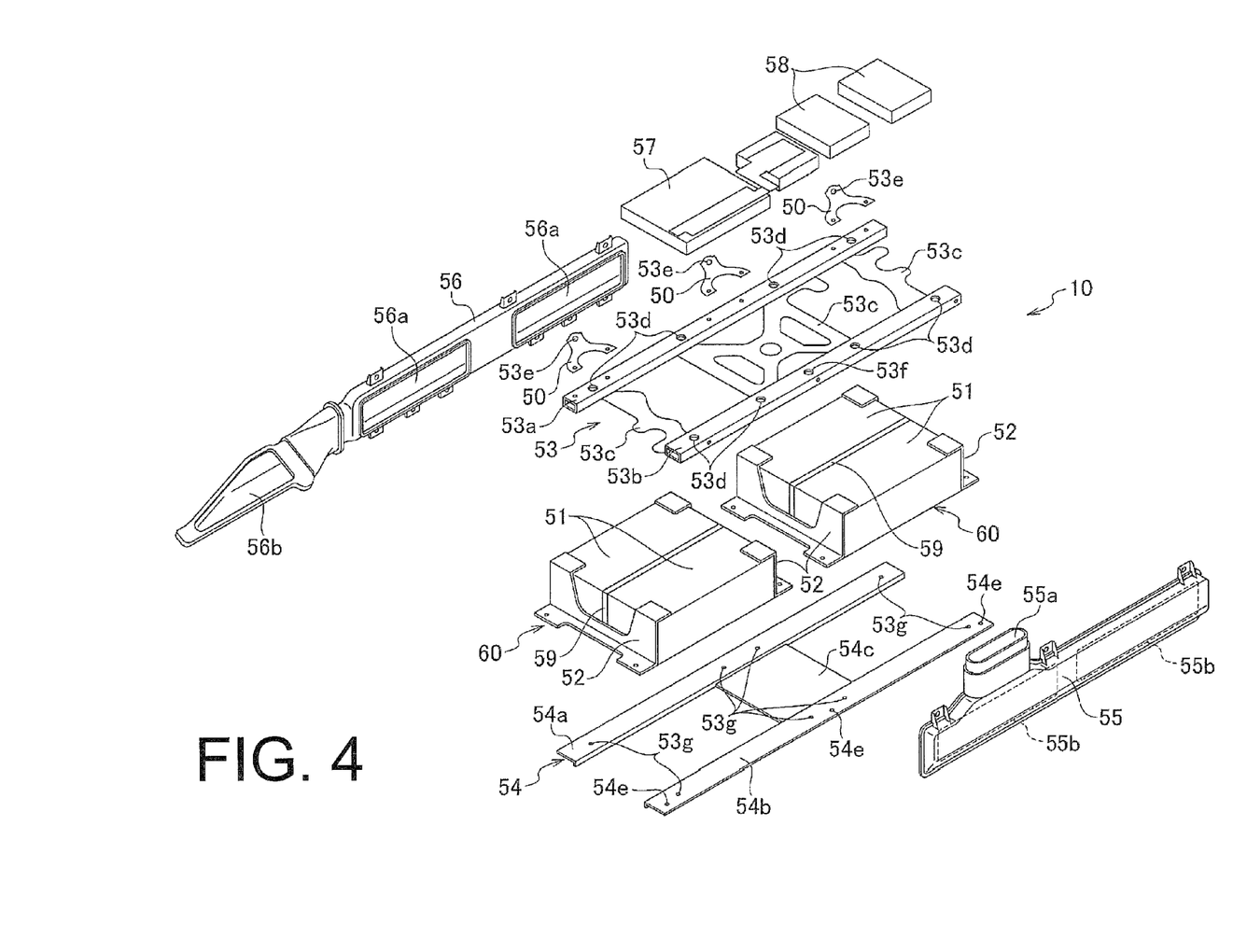
FIG. 4 is an exploded perspective view of the battery unit.
Figure 5:
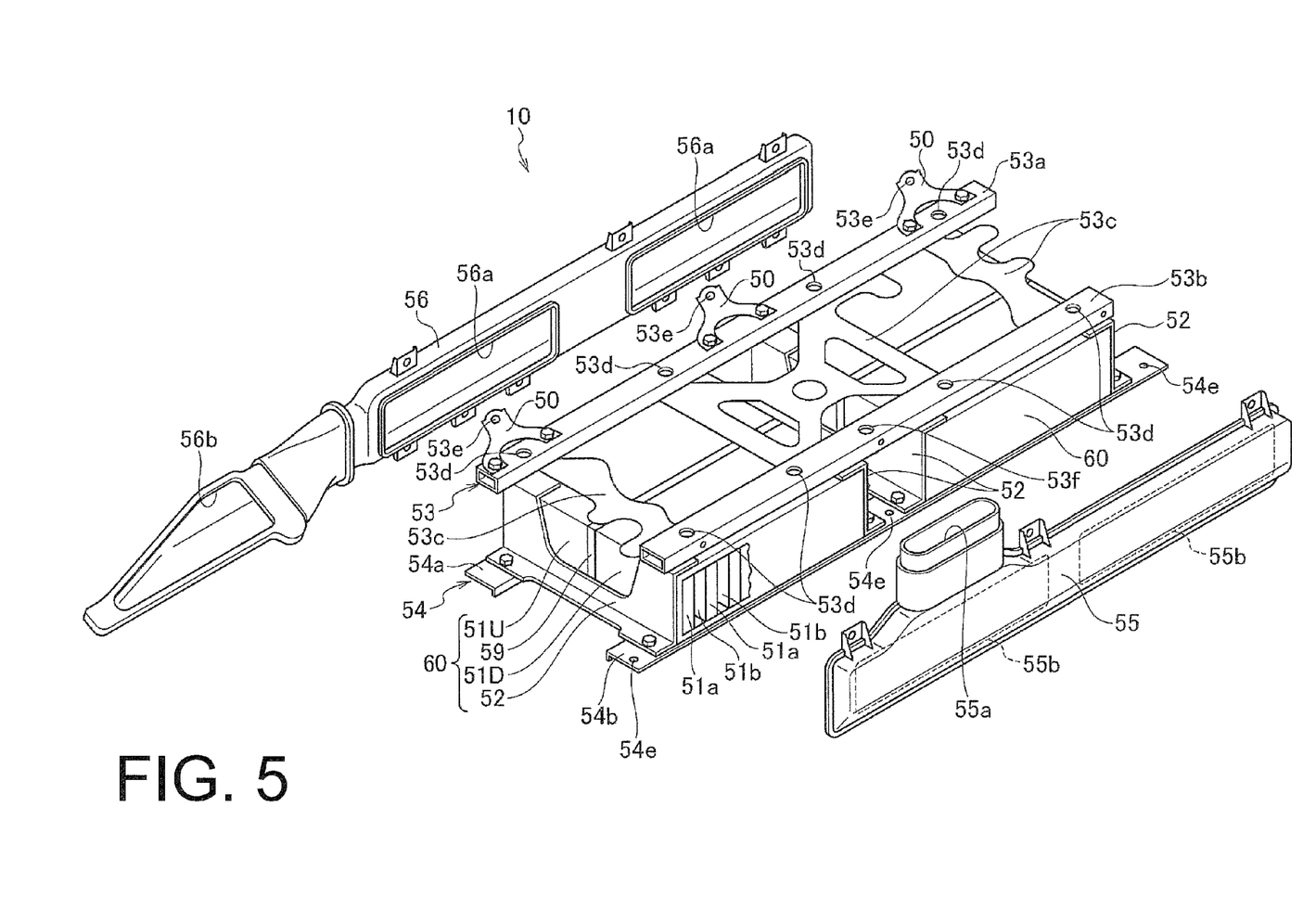
FIG. 5 is an exploded perspective view of the battery unit in which only ducts are disassembled.
Figure 6:
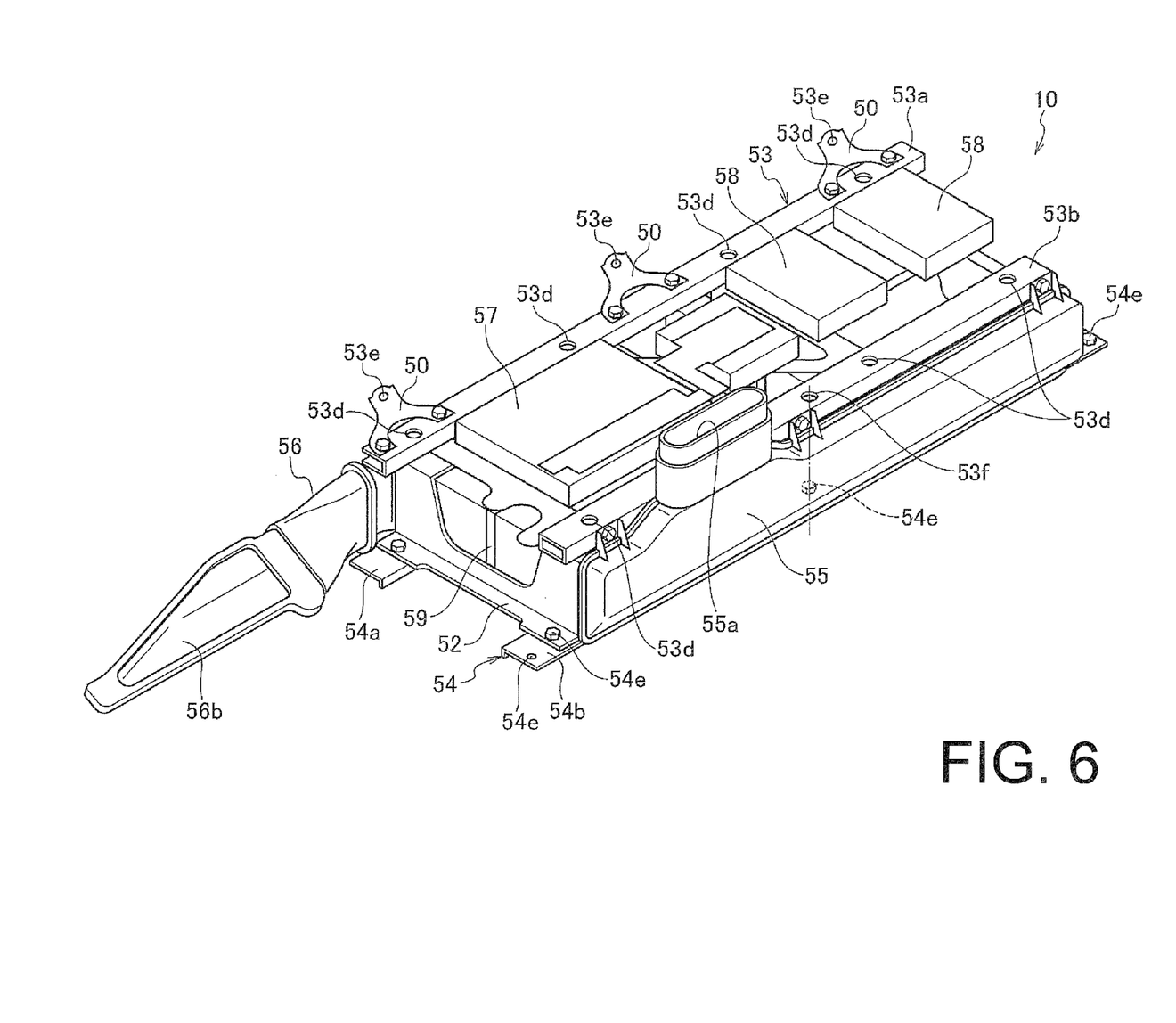
FIG. 6 is a perspective view of the battery unit.

FIG. 4 is an exploded perspective view of the battery unit 10, FIG. 5 is an exploded perspective view of the battery unit 10 in which only ducts are dissembled, and FIG. 6 is a perspective view of the battery unit 10.

As shown in FIGS. 4 to 6, the battery unit 10 includes: multiple battery modules 51; multiple battery brackets 52 supporting right and left side parts of the battery module 51; a front frame 53 provided along a front surface of the battery unit 10 and supporting the multiple battery modules 51 through the battery brackets 52; a rear frame 54 provided along a rear surface of the battery unit 10 and supporting the multiple battery modules 51 through the battery brackets 52; an inlet duct 55 provided along a lower surface of the battery unit 10, and introducing cooling air fed from outside the high voltage equipment-accommodation portion 13 into the battery modules 51; an exhaust duct 56 provided along an upper surface of the battery unit 10, and discharging cooling air having passed through the battery modules 51 to the DC-DC converter 11; a battery control unit 57 provided on the front frame 53, and controlling charging and discharging of the battery modules 51; and a pair of motor control units 58 provided on the front frame 53, and controlling driving of the motors.

The battery module 51 includes multiple batteries 51a arranged in parallel, with cooling air passages 51b interposed therebetween. The battery module 51 includes an upper battery module 51U and a lower battery module 51D stacked in the flow direction of cooling air, and an intermediate duct 59 that prevents leakage of cooling air is arranged between the upper battery module 51U and the lower battery module 51D. The vertically stacked upper battery module 51U and lower battery module 51D are connected by the battery brackets 52 provided on both right and left side surfaces thereof, and form a battery assembly 60. The battery unit 10 of the embodiment is configured of two battery assemblies 60 arranged side by side in the vehicle width direction.

The front frame 53 includes: an upper frame member 53a extending in the vehicle width direction in an upper part of the front surface of the battery unit 10; a lower frame member 53b extending in the vehicle width direction in a lower part of the front surface of the battery unit 10; and multiple connection members 53c connecting the upper frame member 53a and the lower frame member 53b. Multiple battery fastening points 53d fastened to the battery brackets 52 are provided in the upper frame member 53a and the lower frame member 53b. Additionally, three Y-formed brackets 50 each having an upper fastening point 53e fastened to the upper member 7 are attached to the upper frame member 53a, while a tool insertion hole 53f for inserting a tool when fastening the rear frame 54 to the lower member 8 is formed at the center in the vehicle width direction of the lower frame member 53b.

The rear frame 54 includes: an upper frame member 54a extending in the vehicle width direction in an upper part of the rear surface of the battery unit 10; a lower frame member 54b extending in the vehicle width direction in a lower part of the rear surface of the battery unit 10; and a connection member 54c connecting the upper frame member 54a and the lower frame member 54b. Multiple battery fastening points 53g fastened to the battery brackets 52 are provided in the upper frame member 54a and the lower frame member 54b. Three lower fastening points 54e fastened to the lower member 8 are provided in the lower frame member 54b.

The inlet duct 55 includes: an inlet port 55a for introducing cooling air fed from outside the high voltage equipment-accommodation portion 13 into the duct; and two battery connection ports 55b connected to the lower surface side of the lower battery modules 51D, and allowing cooling air inside the duct to flow into the passages 51b in the lower battery modules 51D.

The exhaust duct 56 includes; two battery connection ports 56a connected to the upper surface side of the upper battery modules 51U, and introducing cooling air having flowed out from the passages 51b in the upper battery modules 52U into the duct; and an exhaust port 56b for discharging cooling air inside the duct to the DC-DC converter 11.

When storing the battery unit 10 and the DC-DC converter 11 in the high voltage equipment-accommodation portion 13, first, a rear insulator (not shown) extending along a front surface of the rear cover 15, and right and left side insulators 16 extending along the inner side of the right and left pillars 9 are attached inside the high voltage equipment-accommodation portion 13. Then, while the battery unit 10 is positioned in a left offset position inside the high voltage equipment-accommodation portion 13, the upper fastening points 53e of the front frame 53 are fastened to the upper member 7 with bolts, and the lower fastening points 54e of the rear frame 54 are fastened to the lower member 8 with bolts. Note that when fastening the middle lower fastening point 54e of the rear frame 54 to the lower member 8 with a bolt, a tool is inserted into the tool insertion hole 53f formed at the center in the vehicle width direction of the lower frame member 53b, and the rear frame 54 is fastened to the lower member 8 with a bolt. Thus, the battery unit 10 is fixed inside the high voltage equipment-accommodation portion 13, while being tilted rearward along a back 3a of the seat 3 in side view. Thereafter, the DC-DC converter 11 is positioned in a right offset position inside the high voltage equipment-accommodation portion 13, and fastened to the upper member 7 and the lower member 8. Thus, the battery unit 10 and the DC-DC converter 11 are arranged side by side in the vehicle width direction, inside the high voltage equipment-accommodation portion 13.

As mentioned above, the battery unit 10 accommodated in the high voltage equipment-accommodation portion 13 provided behind the seat 3 is tilted rearward along the back 3a of the seat 3 in side view, while its upper part is fastened to the upper member 7 through multiple upper fastening points 53e, and its lower part is fastened to the lower member 8 through multiple lower fastening points 54e. Accordingly, the upper member 7 and the lower member 8 support the battery unit 10 at both ends in the vertical direction.

[Cooling Mechanism]

Next, a cooling mechanism C for cooling the battery unit 10 and the DC-DC converter 11 will be described with reference to FIGS. 1 and 3.

As shown in FIGS. 1 and 3, the cooling mechanism C is configured of the aforementioned inlet duct 55, exhaust duct 56, and intermediate duct 59, and also an air conditioning system 61, an intake duct 62, a cooling fan 63, a supply duct 64, and an exhaust passage 65. While the air conditioning system 61 is arranged in front of the seats 3 to air condition the vehicle inside 4, the cooling mechanism C cools the battery unit 10 and the DC-DC converter 11 by use of air (cold air) having passed through the air conditioning system 61. The cooling fan 63 is arranged in front of the seats 3, and above the center tunnel 5a. An intake port 63a of the cooling fan 63 is connected to the air conditioning system 61 through the intake duct 62, and a discharge port 63b of the cooling fan 63 is connected to the aforementioned inlet port 55a of the inlet duct 55, through the supply duct 64 provided inside the center console 12.

When powered on, the cooling fan 63 sucks in cooling air having passed through the air conditioning system 61 through the intake duct 62, and sends the sucked in cooling air to the inlet duct 55 of the battery unit 10 through the supply duct 64. The inlet duct 55 introduces the cooling air from the cooling fan 63 into the high voltage equipment-accommodation portion 13, and allows the cooling air to flow into the passages 51b of the two battery assemblies 60 arranged side by side, from below. The cooling air having flowed into the passages 51b of the battery assemblies 60 is guided upward while cooling the battery modules 51, and flows into the exhaust duct 56. The cooling air having flowed into the exhaust duct 56 is guided to one side (right side in the embodiment) along the exhaust duct 56, and is discharged to the DC-DC converter 11 from above, through the exhaust port 56b of the exhaust duct 56. The cooling air having flowed into the DC-DC converter 11 is guided downward while passing the back of and cooling the DC-DC converter 11, and is diffused into the high voltage equipment-accommodation portion 13 from a lower part of the DC-DC converter 11. Then, the cooling air diffused inside the high voltage equipment-accommodation portion 13 is discharged into the vehicle inside 4, through the discharge passage 65 formed on the lower end side of the high voltage equipment-accommodation portion 13.

Figure 8:
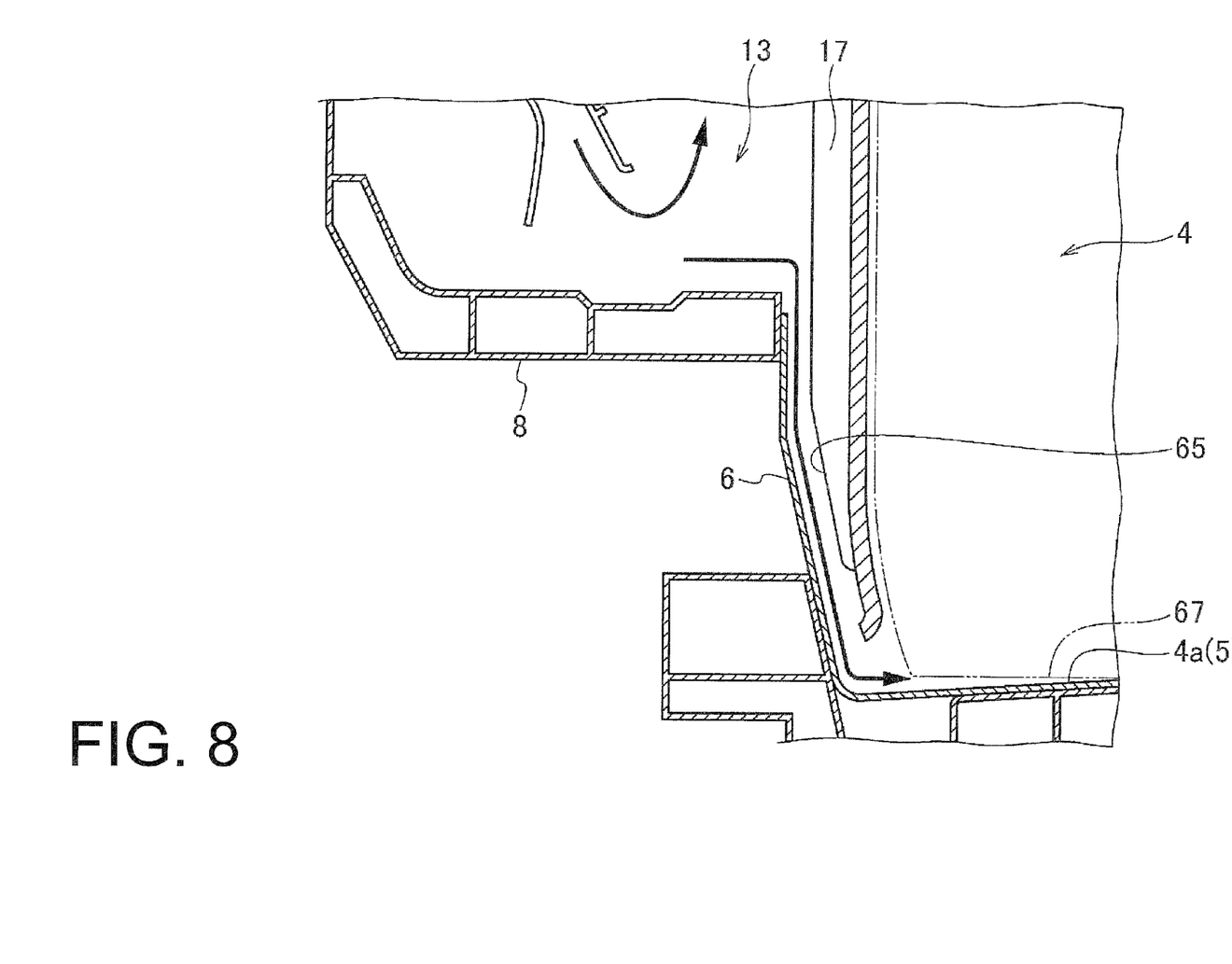
FIG. 8 is a cross-sectional view of a main part of a discharge passage.

FIG. 8 is a cross-sectional view of a main part of a discharge passage.

As shown in FIG. 8, a discharge passage 65 guides air inside the high voltage equipment-accommodation portion 13 downward from a lower end part of the high voltage equipment-accommodation portion 13, and discharges it into the vehicle inside 4 from the vicinity of a floor surface 4a of the vehicle inside 4. The embodiment utilizes the kick-up portion 6 and the high voltage equipment-protection cover 17 to form the discharge passage 65. That is, the high voltage equipment-accommodation portion 13 is positioned behind the kick-up portion 6 where the floor panel 5 rises upward, and the high voltage equipment-protection cover 17 covers the high voltage equipment-accommodation portion 13 from the front, while also covering a front surface (except for lower part of front surface) of the kick-up portion 6 with a gap in between. Thus, the discharge passage 65 whose upper end side communicates into the high voltage equipment-accommodation portion 13, and lower end side communicates into the vehicle inside 4 is formed, between the kick-up portion 6 and the high voltage equipment-protection cover 17.

As shown in FIG. 3, a seal member 66 for preventing leakage of air is provided between the high voltage equipment-protection cover 17 and the upper member 7, and between the high voltage equipment-protection cover 17 and the side insulator 16. However, the seal member is omitted between the high voltage equipment-protection cover 17 and the kick-up portion 6, to ensure the gap that serves as the discharge passage 65. The discharge passage 65 is formed in this manner, over almost the entire high voltage equipment-accommodation portion 13 in the vehicle width direction.

As shown in FIG. 8, the discharge passage 65 guides air inside the high voltage equipment-accommodation portion 13 downward from a front end part of a lower surface of the high voltage equipment-accommodation portion 13, so that the air hits the floor surface 4a, and then guides the air frontward along the floor surface 4a, from the gap between the lower end of the high voltage equipment-protection cover 17 and the floor surface 4a. Then, the air guided frontward passes through a carpet 67, which is continuously laid on the floor surface 4a and on a front surface of the high voltage equipment-protection cover 17, and is discharged into the vehicle inside 4.

As has been described, according to the vehicle 1 of the embodiment, cooling air used for cooling the battery unit 10 and the DC-DC converter 11 is diffused into the high voltage equipment-accommodation portion 13, and then discharged into the vehicle inside 4 from inside the high voltage equipment-accommodation portion 13, through the discharge passage 65. Hence, the temperature of the cooling air used for cooling can be lowered to some extent inside the high voltage equipment-accommodation portion 13, before discharging into the vehicle inside 4.

Also, the discharge passage 65 guides relatively low-temperature air accumulated on the lower end side in the high voltage equipment-accommodation portion 13, into the vehicle inside 4. Hence, even lower-temperature air can be discharged into the vehicle inside 4.

Also, the discharge passage 65 guides air inside the high voltage equipment-accommodation portion 13 downward, and discharges it into the vehicle inside 4 from the vicinity of the floor surface 4a of the vehicle inside 4. Hence, the exhaust air homogenizes the temperature distribution of exhaust air while rising up from the floor surface 4a, so that heat of exhaust air is less likely to affect the occupant.

Also, cooling air introduced from a lower part of the high voltage equipment-accommodation portion 13 is guided upward while cooling the battery unit 10, is guided downward while cooling the DC-DC converter 11 arranged next to the battery unit 10 in the vehicle width direction, and then is diffused into the high voltage equipment-accommodation portion 13. Hence, the battery unit 10 and the DC-DC converter 11 can be cooled appropriately inside the high voltage equipment-accommodation portion 13.

Also, since the discharge passage 65 is formed over almost the entire high voltage equipment-accommodation portion 13 in the vehicle width direction, the discharge passage can diffuse air inside the high voltage equipment-accommodation portion 13 in the vehicle width direction, while discharging it into the vehicle inside 4.

Also, the discharge passage 65 discharges air inside the high voltage equipment-accommodation portion 13 into a space between the carpet 67 laid on the floor surface 4a, and the floor surface 4a. Hence, exhaust air can be weakened as it passes through the carpet 67, and is less likely to affect the occupant.

Also, since the discharge passage 65 is formed by utilizing the kick-up portion 6 and the high voltage equipment-protection cover 17, the number of parts and cost can be reduced, as compared to providing a special discharge passage member.

Also, since cooling air is introduced from the air conditioning system 61 arranged in front of the seats 3, the battery unit 10 and the DC-DC converter 11 can be cooled efficiently with cold air having passed through the air conditioning system 61.

Note that the present invention is not limited to the embodiment described above, and may be modified or improved, for example, as is appropriate.

For example, while the embodiment uses the battery unit and the DC-DC converter as an example of high voltage equipment to which the present invention is applied, the high voltage equipment to which the present invention is applied may be any one of a battery unit, a DC-DC converter, and an inverter, or a combination of two or more of these devices. Also, the battery does not necessarily have to be unitized.

The vehicle (e.g. vehicle 1 of the embodiment) includes: high voltage equipment (e.g. the battery unit 10 and the DC-DC converter 11 of the embodiment) accommodated in a high voltage equipment-accommodation portion (e.g. the high voltage equipment-accommodation portion 13 of the embodiment) provided behind a seat (e.g. the seats 3 of the embodiment); and a cooling mechanism (e.g. the cooling mechanism C of the embodiment) for cooling the high voltage equipment with cooling air introduced from outside the high voltage equipment-accommodation portion. The cooling mechanism diffuses cooling air used for cooling the high voltage equipment into the high voltage equipment-accommodation portion, and then discharges the air from inside the high voltage equipment-accommodation portion into a vehicle inside (e.g. the vehicle inside 4 of the embodiment), through a discharge passage (e.g. the discharge passage 65 of the). The discharge passage guides air inside the high voltage equipment-accommodation portion downward from a lower end part of the high voltage equipment-accommodation portion, and discharges the air into the vehicle inside from the vicinity of a floor surface (e.g. the floor surface 4a of the) of the vehicle inside.

The high voltage equipment includes a battery and a DC-DC converter arranged side by side in the vehicle width direction. The cooling mechanism guides cooling air introduced from a lower part of the high voltage equipment-accommodation portion upward while cooling the battery, guides the cooling air downward while cooling the DC-DC converter, and then diffuses the cooling air into the high voltage equipment-accommodation portion.

The discharge passage is formed over almost the entire high voltage equipment-accommodation portion in the vehicle width direction.

The discharge passage discharges air inside the high voltage equipment-accommodation portion, into a space between a carpet (e.g. the carpet 67 of the embodiment) laid on the floor surface, and the floor surface.

The high voltage equipment-accommodation portion is positioned behind a kick-up portion (e.g. the kick-up portion 6 of the embodiment) where a floor panel (e.g. the floor panel 5 of the embodiment) rises upward. The high voltage equipment is covered with a high voltage equipment-protection cover (e.g. the high voltage equipment-protection cover 17 of the embodiment), which covers the high voltage equipment-accommodation portion from the front and covers a part of the kick-up portion. The discharge passage is provided between the kick-up portion and the high voltage equipment-protection cover.

The cooling air is introduced from an air conditioning system (e.g. the air conditioning system 61 of the embodiment) arranged in front of the seat.

[Effect]

The cooling air used for cooling the high voltage equipment is diffused into the high voltage equipment-accommodation portion, and then discharged into the vehicle inside from inside the high voltage equipment-accommodation portion, through the discharge passage. Hence, the temperature of the cooling air used for cooling can be lowered to some extent inside the high voltage equipment-accommodation portion, before discharging into the vehicle inside. Also, the discharge passage guides relatively low-temperature air accumulated on the lower end side in the high voltage equipment-accommodation portion, into the vehicle inside. Hence, even lower-temperature air can be discharged into the vehicle inside. Moreover, the discharge passage guides air inside the high voltage equipment-accommodation portion downward, and discharges it into the vehicle inside from the vicinity of the floor surface of the vehicle inside. Hence, the exhaust air homogenizes the temperature distribution of exhaust air while rising up from the floor surface, so that heat of exhaust air is less likely to affect the occupant.

Also, cooling air introduced from a lower part of the high voltage equipment-accommodation portion is guided upward while cooling the battery, is guided downward while cooling the DC-DC converter arranged next to the battery in the vehicle width direction, and then is diffused into the high voltage equipment-accommodation portion. Hence, the battery and the DC-DC converter can be cooled appropriately inside the high voltage equipment-accommodation portion.

Also, since the discharge passage is formed over almost the entire high voltage equipment-accommodation portion in the vehicle width direction, the discharge passage can diffuse air inside the high voltage equipment-accommodation portion in the vehicle width direction, while discharging it into the vehicle inside.

Also, the discharge passage discharges air inside the high voltage equipment-accommodation portion into a space between the carpet laid on the floor surface, and the floor surface. Hence, exhaust air can be weakened as it passes through the carpet, and is less likely to affect the occupant.

Also, since the discharge passage is formed by utilizing the kick-up portion and the high voltage equipment-protection cover, the number of parts and cost can be reduced, as compared to providing a special discharge passage member.

Also, since cooling air is introduced from the air conditioning system arranged in front of the seat, the high voltage equipment can be cooled efficiently with cold air having passed through the air conditioning system.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
high voltage equipment accommodated in a high voltage equipment-accommodation portion provided behind a seat, the high voltage equipment including a battery; and
a cooling mechanism for cooling said high voltage equipment with cooling air introduced from outside the high voltage equipment-accommodation portion, wherein:
said cooling mechanism diffuses cooling air used for cooling said high voltage equipment into said high voltage equipment-accommodation portion, and then discharges the air from inside said high voltage equipment-accommodation portion into a vehicle inside, through a discharge passage;
said discharge passage guides air inside said high voltage equipment-accommodation portion downward from a lower end part of said high voltage equipment-accommodation portion, and discharges the air into said vehicle inside from the vicinity of a floor surface of said vehicle inside; and
said cooling mechanism guides cooling air introduced from a lower part of said high voltage equipment-accommodation portion upward thereby simultaneously passing by and cooling said battery.

2. The vehicle according to claim 1, wherein:
said high voltage equipment includes said battery and a DC-DC converter arranged side by side in the vehicle width direction; and
said cooling mechanism guides the cooling air downward while cooling said DC-DC converter and then diffuses the cooling air into said high voltage equipment-accommodation portion.

3. A vehicle comprising:
high voltage equipment accommodated in a high voltage equipment-accommodation portion provided behind a seat; and
a cooling mechanism for cooling said high voltage equipment with cooling air introduced from outside the high voltage equipment-accommodation portion, wherein:
said cooling mechanism diffuses cooling air used for cooling said high voltage equipment into said high voltage equipment-accommodation portion, and then discharges the air from inside said high voltage equipment-accommodation portion into a vehicle inside, through a discharge passage;
said discharge passage guides air inside said high voltage equipment-accommodation portion downward from a lower end part of said high voltage equipment-accommodation portion, and discharges the air into said vehicle inside from the vicinity of a floor surface of said vehicle inside; and
said discharge passage is formed over almost the entire high voltage equipment-accommodation portion in the vehicle width direction, but not wider thereof.

4. A vehicle comprising:
high voltage equipment accommodated in a high voltage equipment-accommodation portion provided behind a seat; and
a cooling mechanism for cooling said high voltage equipment with cooling air introduced from outside the high voltage equipment-accommodation portion, wherein:
said cooling mechanism diffuses cooling air used for cooling said high voltage equipment into said high voltage equipment-accommodation portion, and then discharges the air from inside said high voltage equipment-accommodation portion into a vehicle inside, through a discharge passage;
said discharge passage guides air inside said high voltage equipment-accommodation portion downward from a lower end part of said high voltage equipment-accommodation portion, and discharges the air into said vehicle inside from the vicinity of a floor surface of said vehicle inside; and
said discharge passage discharges air inside said high voltage equipment-accommodation portion, into a space between a carpet laid on said floor surface, and said floor surface.

5. A vehicle comprising:
high voltage equipment accommodated in a high voltage equipment-accommodation portion provided behind a seat; and
a cooling mechanism for cooling said high voltage equipment with cooling air introduced from outside the high voltage equipment-accommodation portion, wherein:
said cooling mechanism diffuses cooling air used for cooling said high voltage equipment into said high voltage equipment-accommodation portion, and then discharges the air from inside said high voltage equipment-accommodation portion into a vehicle inside, through a discharge passage;
said discharge passage guides air inside said high voltage equipment-accommodation portion downward from a lower end part of said high voltage equipment-accommodation portion, and discharges the air into said vehicle inside from the vicinity of a floor surface of said vehicle inside;
said high voltage equipment-accommodation portion is positioned behind a kick-up portion where a floor panel rises upward;
said high voltage equipment is covered with a high voltage equipment-protection cover, which covers said high voltage equipment-accommodation portion from the front and covers a part of said kick-up portion; and
said discharge passage is provided between said kick-up portion and said high voltage equipment-protection cover.

6. The vehicle according to claim 1, wherein
said cooling air is introduced from an air conditioning system arranged in front of said seat.

7. A vehicle comprising:
a high voltage equipment-accommodation portion provided behind a seat and including a high voltage equipment including a battery;
a cooling mechanism to cool the high voltage equipment with cooling air introduced from an outside of the high voltage equipment-accommodation portion and to diffuse in the high voltage equipment-accommodation portion the cooling air which has cooled the high voltage equipment; and
a discharge passage connecting a lower end part of the high voltage equipment-accommodation portion and a vicinity of a floor surface in the vehicle interior, the cooling mechanism being configured to discharge the cooling air in the high voltage equipment-accommodation portion downwardly to the vehicle interior via the discharge passage, wherein the cooling mechanism guides the cooling air introduced from a lower part of the high voltage equipment-accommodation portion upward thereby simultaneously passing by and cooling the battery.

8. The vehicle according to claim 7, wherein
the high voltage equipment includes the battery and a DC-DC converter arranged side by side in a vehicle width direction, and
the cooling mechanism guides the cooling air downward while cooling the DC-DC converter and then diffuses the cooling air into the high voltage equipment-accommodation portion.

9. A vehicle comprising:
a high voltage equipment-accommodation portion provided behind a seat and including a high voltage equipment;
a cooling mechanism to cool the high voltage equipment with cooling air introduced from an outside of the high voltage equipment-accommodation portion and to diffuse in the high voltage equipment-accommodation portion the cooling air which has cooled the high voltage equipment; and
a discharge passage connecting a lower end part of the high voltage equipment-accommodation portion and a vicinity of a floor surface in the vehicle interior, the cooling mechanism being configured to discharge the cooling air in the high voltage equipment-accommodation portion downwardly to the vehicle interior via the discharge passage, wherein
the discharge passage is formed over almost the entire high voltage equipment-accommodation portion in a vehicle width direction, but not wider thereof.

10. A vehicle comprising:
a high voltage equipment-accommodation portion provided behind a seat and including a high voltage equipment;
a cooling mechanism to cool the high voltage equipment with cooling air introduced from an outside of the high voltage equipment-accommodation portion and to diffuse in the high voltage equipment-accommodation portion the cooling air which has cooled the high voltage equipment; and
a discharge passage connecting a lower end part of the high voltage equipment-accommodation portion and a vicinity of a floor surface in the vehicle interior, the cooling mechanism being configured to discharge the cooling air in the high voltage equipment-accommodation portion downwardly to the vehicle interior via the discharge passage, wherein
the discharge passage discharges the cooling air inside the high voltage equipment-accommodation portion, into a space between a carpet laid on the floor surface and the floor surface.

11. A vehicle comprising:
a high voltage equipment-accommodation portion provided behind a seat and including a high voltage equipment;
a cooling mechanism to cool the high voltage equipment with cooling air introduced from an outside of the high voltage equipment-accommodation portion and to diffuse in the high voltage equipment-accommodation portion the cooling air which has cooled the high voltage equipment; and
a discharge passage connecting a lower end part of the high voltage equipment-accommodation portion and a vicinity of a floor surface in the vehicle interior, the cooling mechanism being configured to discharge the cooling air in the high voltage equipment-accommodation portion downwardly to the vehicle interior via the discharge passage, wherein
the high voltage equipment-accommodation portion is positioned behind a kick-up portion where a floor panel rises upward,
the high voltage equipment is covered with a high voltage equipment-protection cover, which covers the high voltage equipment-accommodation portion from a front and covers a part of the kick-up portion, and
the discharge passage is provided between the kick-up portion and the high voltage equipment-protection cover.

12. The vehicle according to claim 7, wherein
the cooling air is introduced from an air conditioning system arranged in front of the seat.

13. The vehicle according to claim 7, wherein
the cooling mechanism has a fan to introduce the cooling air.

14. The vehicle according to claim 1, wherein:
said high voltage equipment includes said battery and a DC-DC converter arranged side by side in the vehicle width direction; and
said cooling mechanism guides the cooling air downward while cooling said DC-DC converter.

15. The vehicle according to claim 7, wherein:
the high voltage equipment includes the battery and a DC-DC converter arranged side by side in a vehicle width direction, and
the cooling mechanism guides the cooling air downward while cooling the DC-DC converter.

* * * * *